(12) United States Patent
Kumar

(10) Patent No.: US 9,769,077 B2
(45) Date of Patent: *Sep. 19, 2017

(54) QOS IN A SYSTEM WITH END-TO-END FLOW CONTROL AND QOS AWARE BUFFER ALLOCATION

(71) Applicant: NETSPEED SYSTEMS, San Jose, CA (US)

(72) Inventor: Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,381

(22) Filed: Sep. 13, 2016

(65) Prior Publication Data

US 2017/0063697 A1    Mar. 2, 2017

Related U.S. Application Data

(63) Continuation of application No. 14/185,811, filed on Feb. 20, 2014.

(51) Int. Cl.
*H04L 12/28* (2006.01)
*H04L 12/851* (2013.01)
*H04L 12/801* (2013.01)
*H04L 12/835* (2013.01)
*H04L 12/863* (2013.01)

(52) U.S. Cl.
CPC .............. *H04L 47/24* (2013.01); *H04L 47/19* (2013.01); *H04L 47/30* (2013.01); *H04L 47/62* (2013.01)

(58) Field of Classification Search
CPC ......... H04L 47/24; H04L 47/30; H04L 47/19; H04L 67/00
See application file for complete search history.

(56) References Cited

U.S. PATENT DOCUMENTS 4,409,838 A    10/1983   Schomberg
4,933,933 A     6/1990   Dally et al.
(Continued)

FOREIGN PATENT DOCUMENTS

CN           103684961 A      3/2014
KR     10-2013-0033898 A1     4/2013
(Continued)

OTHER PUBLICATIONS

QNoC: QoS architecture and design process for network on chip: Bolotin et al. 2004.*

(Continued)

*Primary Examiner* — Jay P Patel
(74) *Attorney, Agent, or Firm* — Procopio, Cory, Hargreaves & Savitch LLP

(57) ABSTRACT

The present disclosure is directed to Quality of Service (QoS) and handshake protocols to facilitate endpoint bandwidth allocation among one or more agents in a Network on Chip (NoC) for an endpoint agent. The QoS policy and handshake protocols may involve the use of credits for buffer allocation which are sent to agents in the NoC to compel the acceptance of data and the allocation of an appropriate buffer. Messages sent to the agent may also have a priority associated with the message, wherein higher priority messages have automatic bandwidth allocation and lower priority messages are processed using a handshake protocol.

9 Claims, 14 Drawing Sheets

(56) References Cited

U.S. PATENT DOCUMENTS

| | | | |
|---|---|---|---|
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,859,981 A | 1/1999 | Levin et al. |
| 5,991,308 A | 11/1999 | Fuhrmann et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,415,282 B1 | 7/2002 | Mukherjea et al. |
| 6,674,720 B1 | 1/2004 | Passint et al. |
| 6,711,717 B2 | 3/2004 | Nystrom et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,590,959 B2 | 9/2009 | Tanaka |
| 7,639,037 B1 * | 12/2009 | Eberle .................... H04L 47/10 326/101 |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B2 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0088602 A1 | 5/2003 | Dutta et al. |
| 2003/0145314 A1 | 7/2003 | Nguyen et al. |
| 2004/0049565 A1 | 3/2004 | Keller et al. |
| 2004/0103218 A1 | 5/2004 | Blumrich et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0031615 A1 | 2/2006 | Bruce et al. |
| 2006/0075169 A1 | 4/2006 | Harris et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0103799 A1 | 5/2011 | Shacham et al. |
| 2011/0154282 A1 | 6/2011 | Chang et al. |
| 2011/0191774 A1 | 8/2011 | Hsu et al. |
| 2011/0235531 A1 * | 9/2011 | Vangal .................... H04L 47/30 370/252 |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0155250 A1 | 6/2012 | Carney et al. |
| 2012/0173846 A1 | 7/2012 | Wang et al. |

(56) References Cited

U.S. PATENT DOCUMENTS

| | | |
|---|---|---|
| 2012/0209944 A1 | 8/2012 | Mejdrich et al. |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0211622 A1 | 7/2014 | Kumar et al. |
| 2014/0254388 A1 | 9/2014 | Kumar et al. |
| 2015/0043575 A1 | 2/2015 | Kumar et al. |
| 2015/0109024 A1 | 4/2015 | Abdelfattah et al. |
| 2015/0159330 A1 | 6/2015 | Weisman et al. |

FOREIGN PATENT DOCUMENTS

| | | |
|---|---|---|
| WO | 2010074872 A1 | 7/2010 |
| WO | 2013063484 A1 | 5/2013 |
| WO | 2014059024 A1 | 4/2014 |

OTHER PUBLICATIONS

Ababei, C., et al., Achieving Network on Chip Fault Tolerance by Adaptive Remapping, Parallel & Distributed Processing, 2009, IEEE International Symposium, 4 pgs.

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al. Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Yang, J., et al., Homogeneous NoC-based FPGA: The Foundation for Virtual FPGA, 10th IEEE International Conference on Computer and Information Technology (CIT 2010), Jun. 2010, pp. 62-67.

Zaman, Aanam, "Formal Verification of Circuit-Switched Network on Chip (NoC) Architectures using SPIN", Oosman Hasan, IEEE © 2014, 8 pages.

International Search Report and Written Opinion for PCT/US2014/037902, dated Sep. 30, 2014, 14 pgs.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2013/064140, dated Jan. 22, 2014, 9 pgs.

International Search Report and Written Opinion for PCT/US2014/048190, dated Nov. 28, 2014, 11 pgs.

International Search Report and Written Opinion for PCT/US2014/023625, dated Jul. 10, 2014, 9 pgs.

International Search Report and Written Opinion for PCT/US2014/012012, dated May 14, 2014, 9 pgs.

International Search Report and Written Opinion for PCT/US2014/060892, dated Jan. 27, 2015, 10 pgs.

International Search Report and Written Opinion for PCT/US2014/060886, dated Jan. 26, 2015, 10 pgs.

International Search Report and Written Opinion for PCT/US2014/012003, dated Mar. 26, 2014, 9 pgs.

Office Action for Korean Patent Application No. 10-2016-7019093 dated Sep. 8, 2016, 3 pages plus 1 page English translation. KIPO, Korea.

Notice of Allowance for for Korean Patent Application No. 10-2016-7019093 dated Dec. 5, 2016, 5 pages. KIPO, Korea.

Bolotin, Evgency, et al., "QNoC: QoS Architecture and Design Process for Network on Chip" 2004, 24 pages, Journal of Systems Architecture 50 (2004) 105-128 Elsevier.

* cited by examiner

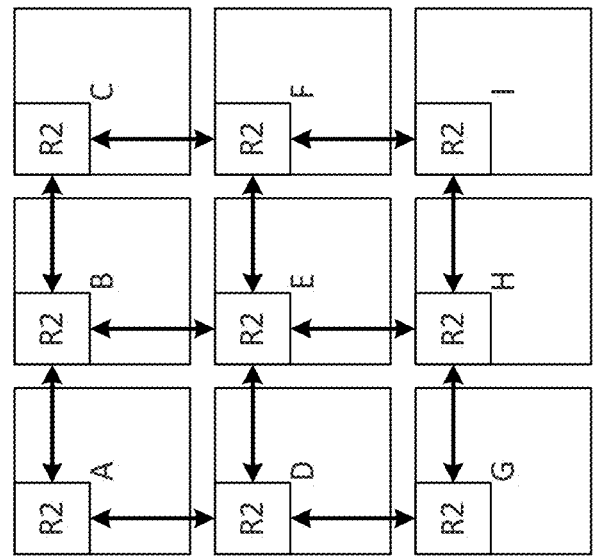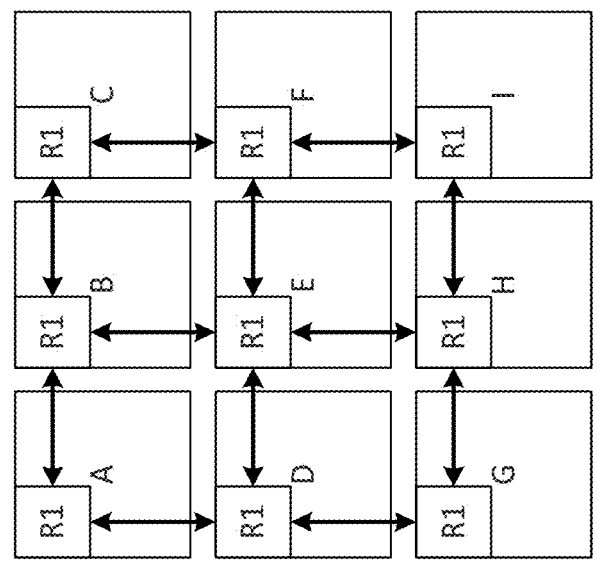
FIG. 3(a)

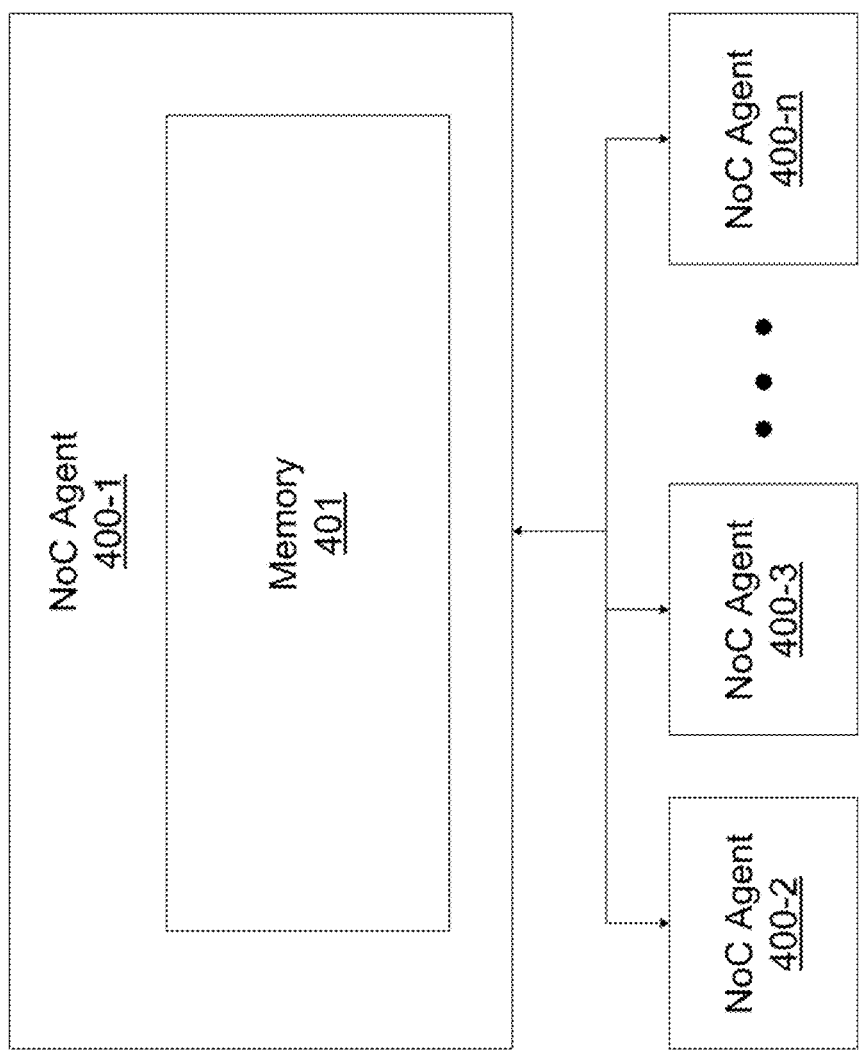

QOS IN A SYSTEM WITH END-TO-END FLOW CONTROL AND QOS AWARE BUFFER ALLOCATION

CROSS REFERENCE TO RELATED APPLICATIONS

The present application is a continuation of U.S. application Ser. No. 14/185,811, filed on Feb. 20, 2014, the disclosure of which is incorporated by reference in its entirety for all purposes.

BACKGROUND

Technical Field

Methods and example implementations described herein are directed to interconnect architecture, and more specifically, implementing Quality of Service (QoS) in a system with end-to-end flow control and QoS aware buffer allocation.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

FIG. 4 illustrates an example configuration of a NoC agent 400. NoC agent, such as agent 400-1 may include a memory 401 that has a buffer for accepting data such as packets or flits. The buffer may be divided into several addresses, which can be allocated to the data in response to a request for accepting data from another NoC agent such as 400-2, 402-3, ..., 402-n, collectively referred to as NoC Agent 400. NoC agent such as 400-1 may be communicatively coupled to one or more other NoC agents 400-i depending on the configuration of the NoC, wherein, once coupled, NoC 400-1 may receive data from other NoC agents 400-2 to 400-n and store the data in the buffer of memory 401 when received.

If a NoC agent 400 processes and accepts requests indiscriminately, problems may arise in optimizing bandwidth allocation. In particular, if a NoC agent 400 is an endpoint (e.g., a resource such as memory or I/O), allocating endpoint bandwidth among a number of NoC agents 400 may not be trivial to resolve.

SUMMARY

The present disclosure is directed to Quality of Service (QoS) and handshake protocols to facilitate endpoint bandwidth allocation among one or more agents in a Network on Chip (NoC) for an endpoint agent. The QoS policy and handshake protocols may involve use of credits for buffer allocation, wherein the credits are sent to agents in the NoC to compel acceptance of data and allocation of an appropriate buffer. Messages sent to NoC agents may also have a priority associated with the message, wherein higher priority messages have automatic bandwidth allocation and lower priority messages are processed using a handshake protocol.

Aspects of the present application may include a method, which involves processing a request for accepting data from a requesting agent associated with a Network on Chip (NoC), wherein processing can include receiving data, at receiving NoC agent, associated with the request when the request is associated with a credit for buffer allocation and utilizing a handshake protocol to process the request when the request is not associated with the credit for buffer allocation. In an implementation, handshake protocol can include determination of whether a buffer is available for receiving data associated with the request, wherein in case a determination, indicative of the buffer being available for receiving data, is made, a credit can be issued for buffer allocation to the requesting NoC agent. On the other hand, in case a determination, indicative of the buffer not being available for accepting data, is made, the requesting NoC agent can be notified with an indication of the buffer not being available.

Aspect of present application may include a computer readable storage medium storing instructions for executing a process. The instructions may involve processing a request for accepting data from a requesting agent associated with a Network on Chip (NoC), wherein processing can include receiving data, at receiving NoC agent, associated with the request when the request is associated with a credit for buffer allocation and utilizing a handshake protocol to process the request when the request is not associated with the credit for buffer allocation. In an implementation, handshake protocol can include determination of whether a buffer is available for receiving data associated with the request, wherein in case a determination, indicative of the buffer being available for receiving data, is made, a credit can be issued for buffer allocation to the requesting NoC agent. On the other hand, in case a determination, indicative of the buffer not being available for accepting data, is made, the requesting NoC agent can be notified with an indication of the buffer not being available.

Aspects of present application may include a method, which involves, for a network on chip (NoC) configuration, including a plurality of cores interconnected by a plurality of NoC agents/routers in a heterogenous or heterogenous mesh, ring, or torus arrangement, allocating one or more buffers to one or more agents associated with a Network on Chip (NoC) based on a Quality of Service (QoS), and sending one or more credits for buffer allocation to the one or more agents based on the allocation. In an implementation, one or more buffers can be reserved for one or more NoC agents that require a reserve buffer based on the QoS policy.

Aspects of the present application may include a system, which involves, a processor that can be configured to execute one or more modules including a memory controller module, wherein the memory controller module can be configured to generate instructions for transmitting data/packets into/from memory controllers of one or more agents of NoC. Module can also be configured to facilitate Quality-of-Service (QoS) through various protocols such as a QoS policy, handshaking protocols, and other protocols depending on desired implementations, wherein the module can either configured within each memory controller of respective NoC agent, or in a group/sub-group of controllers, or can be externally implemented to control and be operatively/communicatively coupled with respective memory controllers. Instructions of the module can be configured to facilitate interaction between the data/packet requesting NoC agents and receiving NoC agents. Such instructions, for instance, can be implemented on a non-transitory computer readable medium and configured to process a request for accepting data, wherein the module may determine whether to act on the request or deny the request. Module may also be configured to implement and allocate bandwidth to associated NoC agents based on a QoS policy by issuing credits for buffer allocation, thereby behaving as a QoS policy allocator (QPA).

BRIEF DESCRIPTION OF THE DRAWINGS

FIG. 3(a) illustrates an example of a related art two layer NoC interconnect.

FIG. 4 illustrates an example configuration of a NoC agent.

DETAILED DESCRIPTION

Figure 1A:
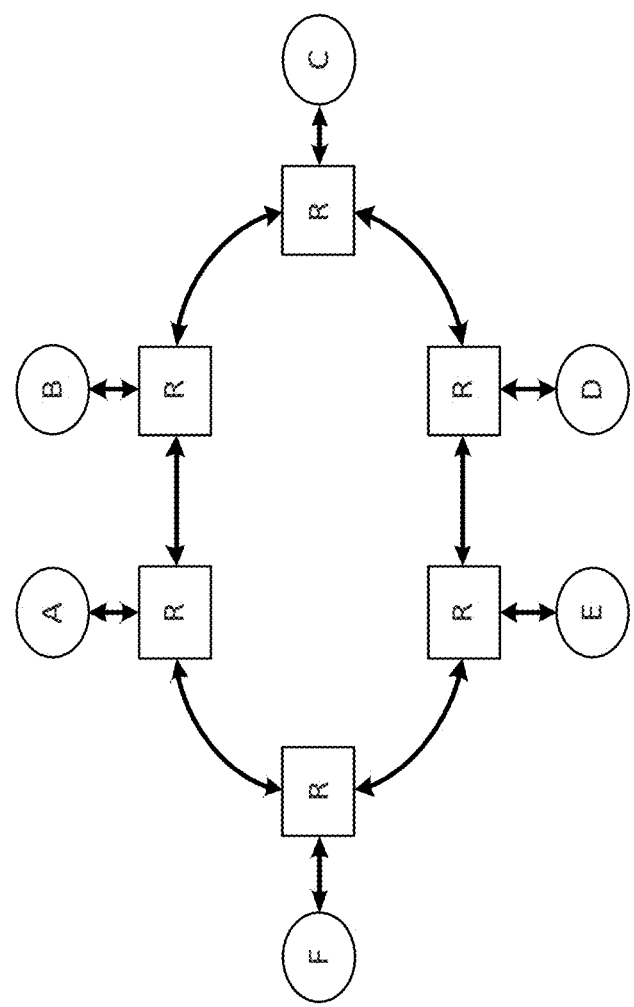
FIGS. 1(a), 1(b) 1(c) and 1(d) illustrate examples of Bidirectional ring, 2D Mesh, 2D Torus, and 3D Mesh NoC Topologies.
Figure 1B:
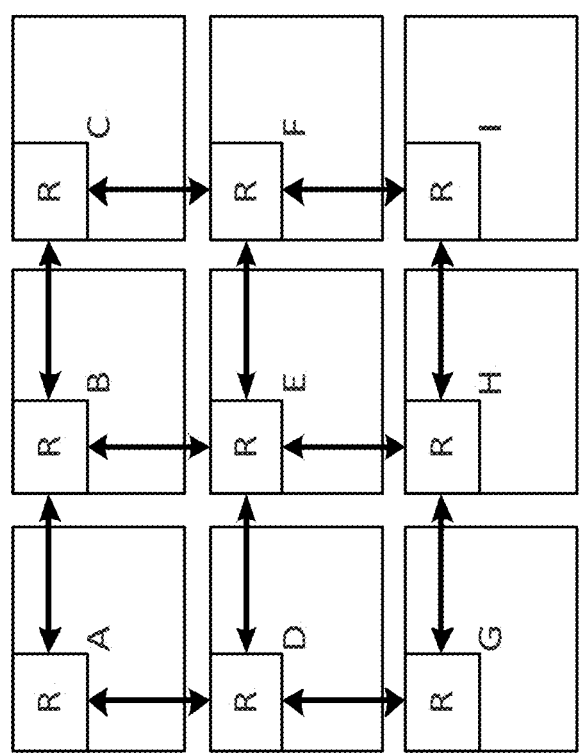
Figure 1C:
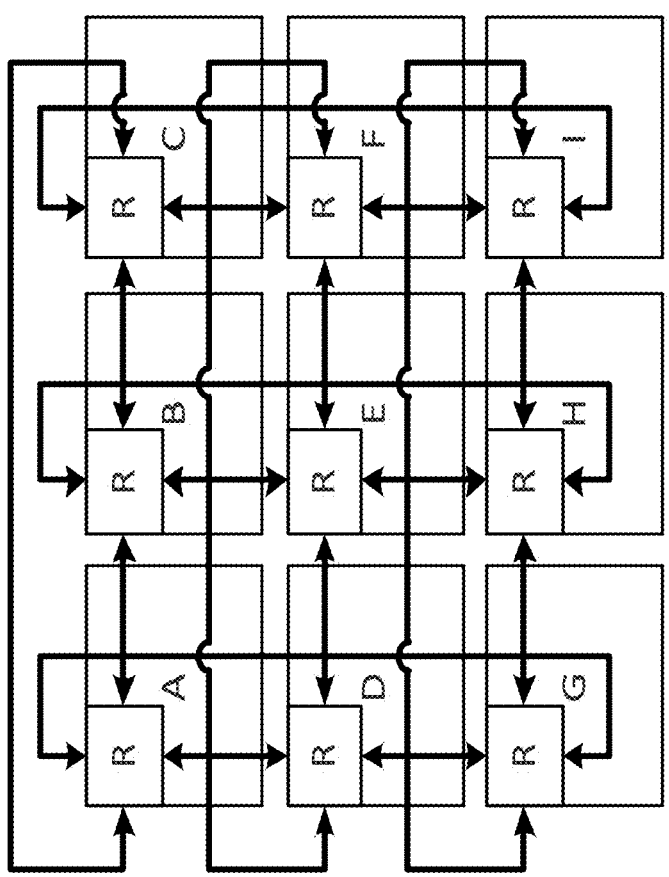
Figure 1D:
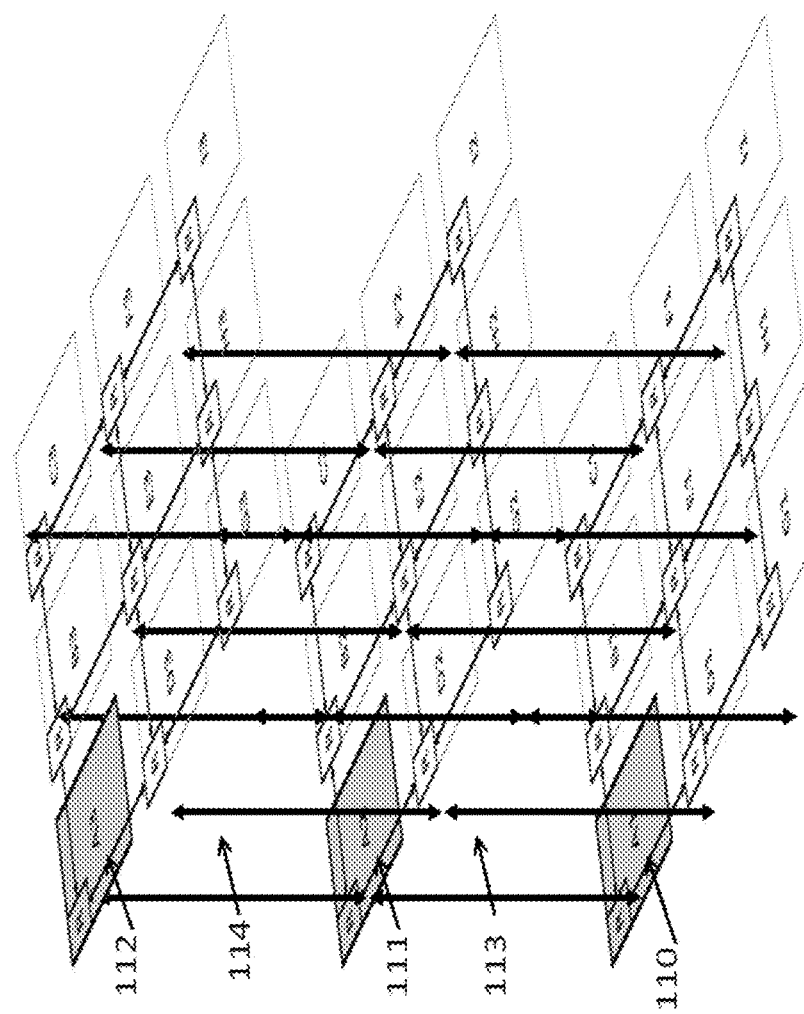
Figure 2A:
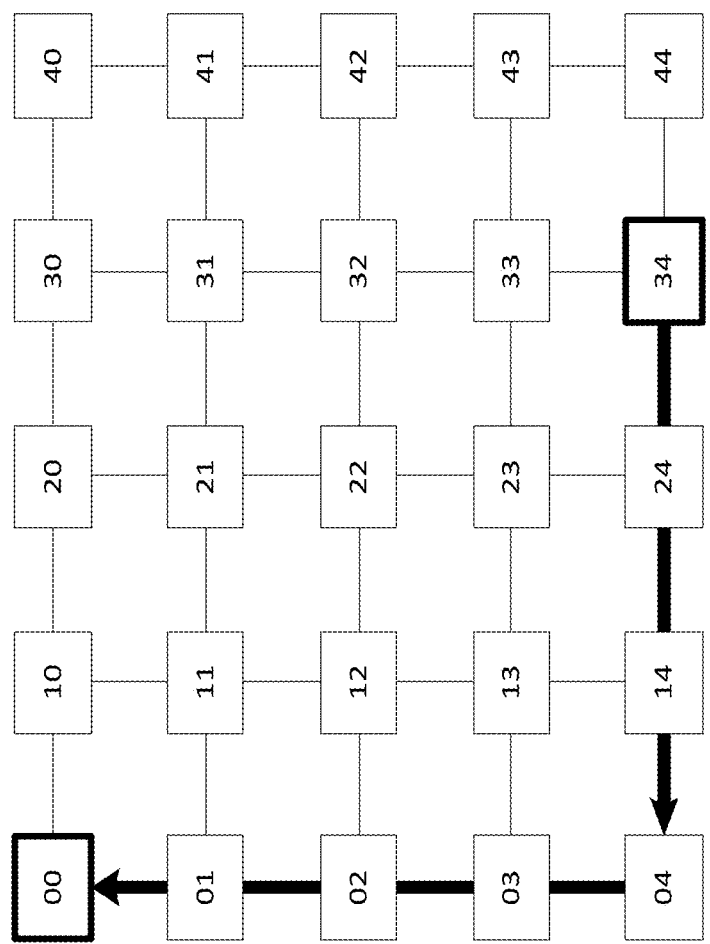
FIG. 2(a) illustrates an example of XY routing in a related art two dimensional mesh.
Figure 2B:
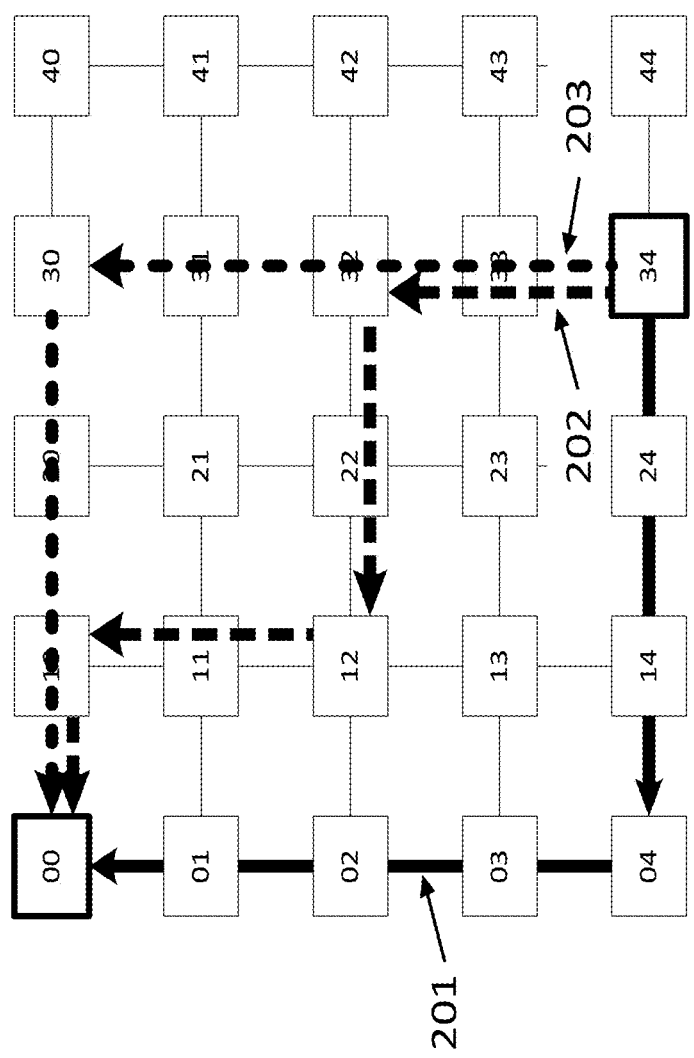
FIG. 2(b) illustrates three different routes between a source and destination nodes.
Figure 3B:
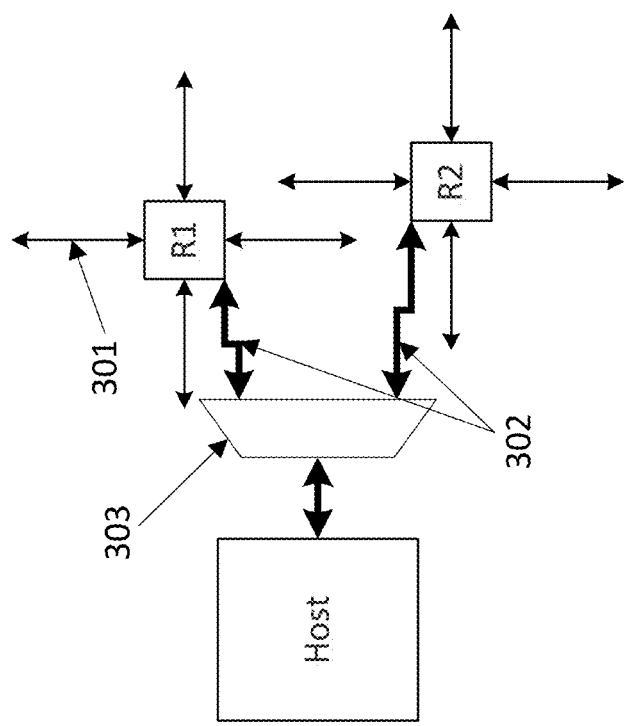
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations described herein are directed to end-to-end flow control for data transmitted within a NoC. By implementation of a flow control, agents that submit a request to send data are configured to send data only when allowed by the receiving NoC agent. In another example implementation, requesting agent obtains permission from receiving agent before the requesting agent can send data. In another example implementation, permission can be granted by the requesting agent when the requesting agent has space in memory. In another implementation, all data sent by the requesting agent must be accepted by the receiving agent, and therefore the receiving agent must have pre-allocated buffers to accept data.

Figure 5:
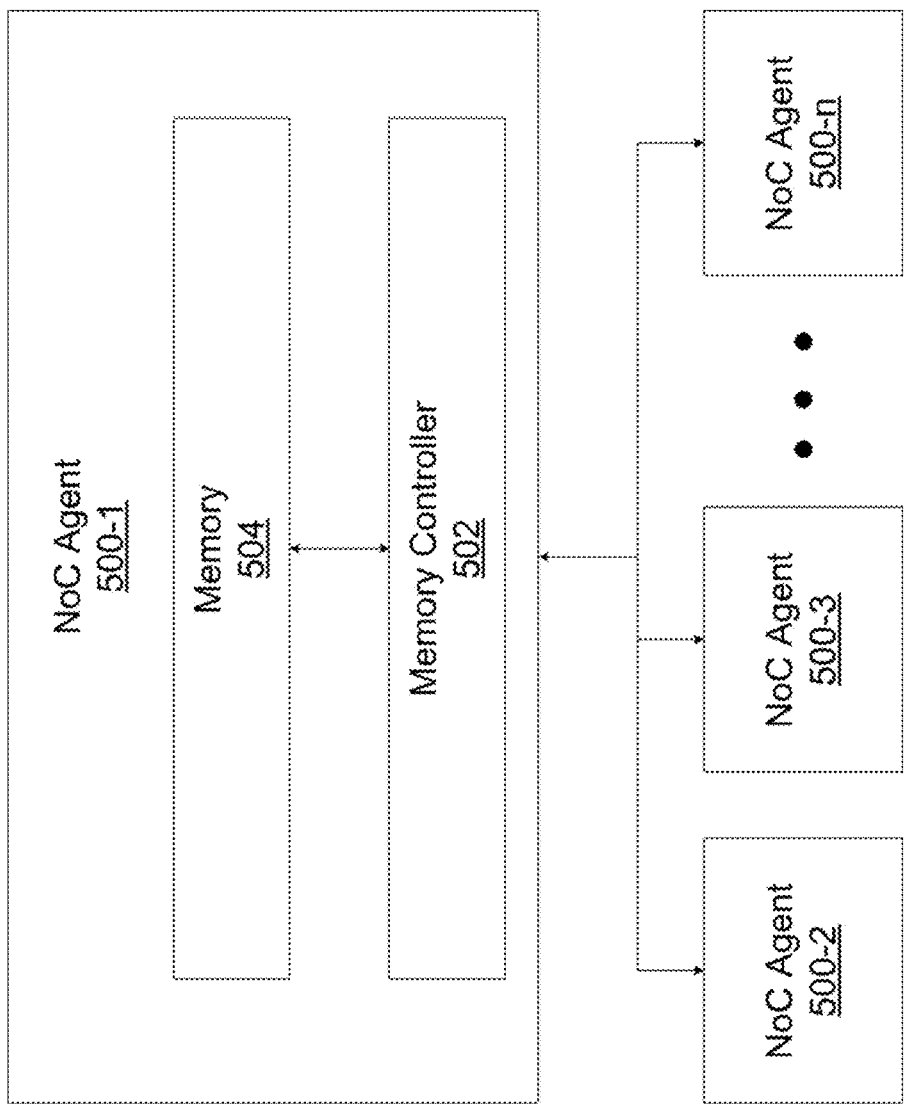
FIG. 5 illustrates an example configuration of a NoC agent in accordance with an example implementation.

FIG. 5 illustrates an example configuration of a NoC agent 500 in accordance with an example implementation of the present disclosure. In an exemplary embodiment, proposed system architecture can include multiple NoC agents/nodes 500-1, 500-2, 500-3, . . . , 500-n, collectively referred to as 500 hereinafter. Each NoC agent such as 500-1 can include a memory 504 operatively coupled with a memory controller 502, which is configured to facilitate Quality-of-Service (QoS) through various protocols such as a QoS policy, handshaking protocols, and other protocols depending on desired implementations. Memory controller 502 can be configured to facilitate interaction between the NoC agent 500-1 and other NoC agents 500-2 to 500-n. For instance, when memory controller 502 processes a request for accepting data, the controller 502 may determine whether to act on the request or deny the request. Memory controller 502 may also initially allocate bandwidth to associated NoC agents 500 based on a QoS policy by issuing credits for buffer allocation, thereby behaving as a QoS policy allocator (QPA).

In an embodiment, various policies can be configured in memory controller 502 based on desired implementations. For example, QoS can be enforced based on a handshake protocol between NoC agent 500-1 and other NoC agents 500. Each NoC agent in the NoC can also be configured with its own memory controller 502 so that the NoC can keep its buffers empty when possible, thereby reducing traffic congestion. Memory controller 502 can achieve this by using end-to-end flow control as described in implementations below to reduce traffic congestion. QoS policy allocator (QPA) and handshake protocols implemented by/in a controller 502 can facilitate the end-to-end flow control.

In another embodiment, memory controller 502 can be a dedicated hardware for handling requests of other agents of the NoC or may also be in the form of a computer readable medium storing instructions for facilitating the requests. Computer readable medium may take the form of a non-transitory computer readable storage medium or a computer readable signal medium as described below. Memory controller 502 may also be implemented as a processor for its respective NoC agent.

According to one embodiment, the present disclosure is directed to Quality of Service (QoS) and handshake protocols to facilitate endpoint bandwidth allocation among one or more agents in a Network on Chip (NoC) for an endpoint agent. The QoS policy and handshake protocols may involve use of credits for buffer allocation, wherein the credits are sent to agents in the NoC to compel acceptance of data and allocation of an appropriate buffer. Messages sent to NoC agents may also have a priority associated with the message, wherein higher priority messages have automatic bandwidth allocation and lower priority messages can be processed using a handshake protocol.

Aspects of the present application may include a method, which involves processing a request for accepting data from a requesting agent associated with a Network on Chip (NoC), wherein processing can include receiving data, at receiving NoC agent, associated with the request when the request is associated with a credit for buffer allocation and utilizing a handshake protocol to process the request when the request is not associated with the credit for buffer allocation. In an implementation, handshake protocol can include determination of whether a buffer is available for receiving data associated with the request, wherein in case a determination, indicative of the buffer being available for receiving data, is made, a credit can be issued for buffer allocation to the requesting NoC agent. On the other hand, in case a determination, indicative of the buffer not being available for accepting data, is made, the requesting NoC agent can be notified with an indication of the buffer not being available. In an implementation, the step of determining indication relating to availability of buffer can further include the step of instructing the requesting NoC agent to wait for an issuance of the credit for buffer allocation. In another example implementation, such an indication can be associated with a time interval for the requesting NoC agent to resend the request upon an elapse of the time interval, wherein the time interval can be determined by one or a combination of the NoC agent and the indication.

Aspects of present application may also include a method, which involves, for a network on chip (NoC) configuration, including a plurality of cores interconnected by a plurality of NoC agents/routers in a heterogenous or heterogenous mesh, ring, or torus arrangement, allocating one or more buffers to one or more agents associated with a Network on Chip (NoC) based on a Quality of Service (QoS), and sending one or more credits for buffer allocation to the one or more agents based on the allocation. In an implementation, one or more buffers can be reserved for one or more NoC agents that require a reserve buffer based on the QoS policy. In an example implementation, allocation of one or more buffers can be done to one or more NoC agents based on the QoS policy, from a pool of buffers.

In another example implementation, method of the proposed architecture can include processing a request for accepting data from a requesting NoC agent and evaluating priority of the request. The method can further include determining whether the evaluated priority is 'high', in which case a credit can be allocated for buffer allocation to the requesting agent. On the other hand, in case it is determined that the priority is not 'not high', the requesting NoC agent can be notified of the buffer not being available. In such a case a credit can be allocated sooner a buffer is available or at any other defined criteria. In another embodiment, a run-time check of a 'not high' request can be done, and sooner the status of the same changes, a credit can be allocated. Number of time a 'not high' request is being received can also be a parameter for deciding when the credit is to be allocated. One should appreciate that any other possible combination or new criteria for deciding when to allocate a credit is completely within the scope of the instant disclosure.

Figure 6:
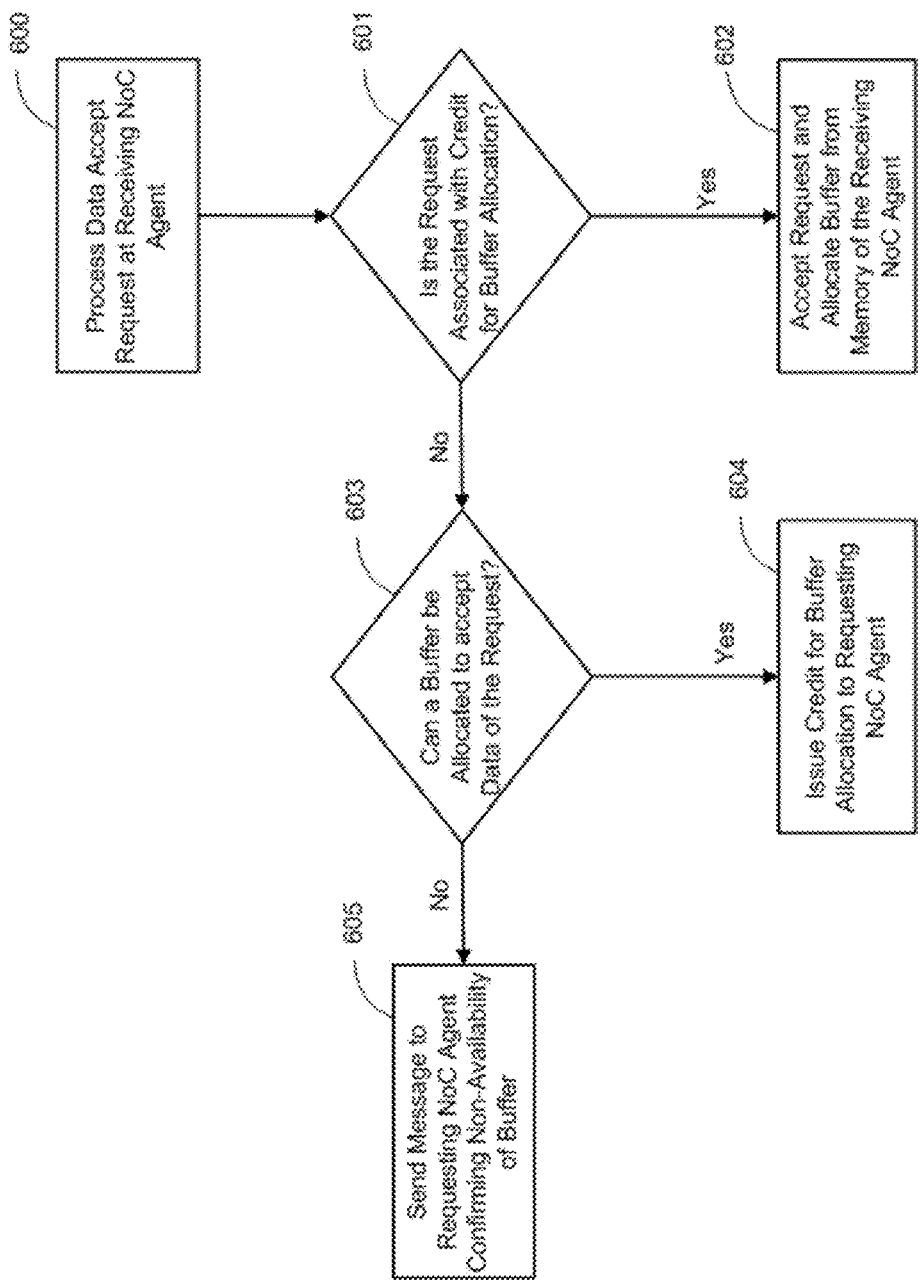
FIG. 6 illustrates an example implementation of a flow diagram for processing a request to accept data in accordance with an example implementation.

FIG. 6 illustrates an example implementation of a flow diagram for processing a request to accept data in accordance with an example implementation of the present invention. In an example flow for processing a request for accepting data from a requesting agent, a request for accepting data is processed by a receiving NoC agent at 600. At 601, a determination is made, by the receiving NoC agent, as to whether the request is associated with a credit for buffer allocation. If so (Yes), the protocol proceeds to 602, wherein the request is accepted and a buffer is allocated from memory of the receiving NoC agent to accept the data. Otherwise (No), a handshake protocol is invoked, and the flow proceeds to 603, wherein a determination is made as to whether a buffer can be allocated to accept the data of the request. If so (Yes), then the flow proceeds to 604, wherein the receiving agent issues a credit for buffer allocation to the requesting agent. In this manner, the requesting agent can subsequently send the request with the credit for the buffer allocation to compel the receiving agent to allocate a buffer for the data.

If a buffer cannot be allocated to accept the data for the request (No), then the flow proceeds to 605, wherein the receiving NoC agent sends a message to the requesting agent that indicates that no buffer is available for the requesting NoC agent. The message may be implemented in various ways, depending on the desired implementation. In one example implementation, the message may be associated with a time interval such that the requesting NoC agent resends the request to the receiving NoC agent once the time interval has elapsed. Time interval can be set based on desired implementation (e.g., based on QoS policy, bandwidth allocated to the agent, etc.). Alternatively, time interval can be determined by the requesting NoC agent based on desired implementation of the requesting NoC agent, and the requesting agent can be configured to automatically resend the request after the time interval has elapsed.

In another example implementation, the message may be associated with instructions to the requesting agent to wait until a credit for buffer allocation is issued by the receiving agent. In this example implementation, the requesting NoC agent does not attempt to resend the request until it receives a credit, wherein the requesting agent resends the request along with the credit to compel the allocation of a buffer for the data.

In an example implementation, receiving NoC agent can also be configured to issue one or more credits for buffer allocation to one or more requesting NoC agents based on QoS policy. In an example implementation, receiving NoC agent can preemptively issue one or more credits to agents that are well known to be potential requesting NoC agents in view of the receiving NoC agent. In this manner, requesting agents can thereby send a request and use one of the preemptively received credit and avoid the handshake protocol. After a requesting agent has used up all of its associated credits, requesting agent can be mandated to obtain additional credits via the handshake protocol. Issuance of credits by the receiving agent can also depend on the QoS policy. For example, a known requesting agent that requires a higher bandwidth may be issued credits, whereas agents that have smaller bandwidth requirements may not be issued credits, or may be issued fewer credits.

In an example embodiment, receiving NoC agent can also be configured to issue credits to requesting agents dynamically. For example, while the receiving NoC agent is receiving data and allocating a buffer from a requesting agent, the receiving agent can issue additional credits to the requesting agent or to other agents in accordance with the QoS policy. The receiving agent can also dynamically allocate buffers based on the credits outstanding (e.g., issued but not yet received).

Furthermore, credits for buffer allocation can be preemptively provided based on expectation of receiving a message such as a reply to a request. FIGS. 7(a)-(f) and 8(a)-(d) illustrate example implementations involving preemptively issuing a credit for buffer allocation. Specifically, FIG. 7(a)-(f) is an example when a handshake protocol is applied. Interaction between two NoC agents requires a total of six transactions. During the first three transactions: a request is first sent (FIG. 7(a)) from a requesting NoC agent 702 to a receiving NoC agent 704 without a credit; the receiving agent 704 issues (FIG. 7(b)) a credit for buffer allocation back to the requesting agent 702; and the requesting agent 702 then receives the credit and resends (FIG. 7(c)) the request with the credit for buffer allocation.

Figure 7:
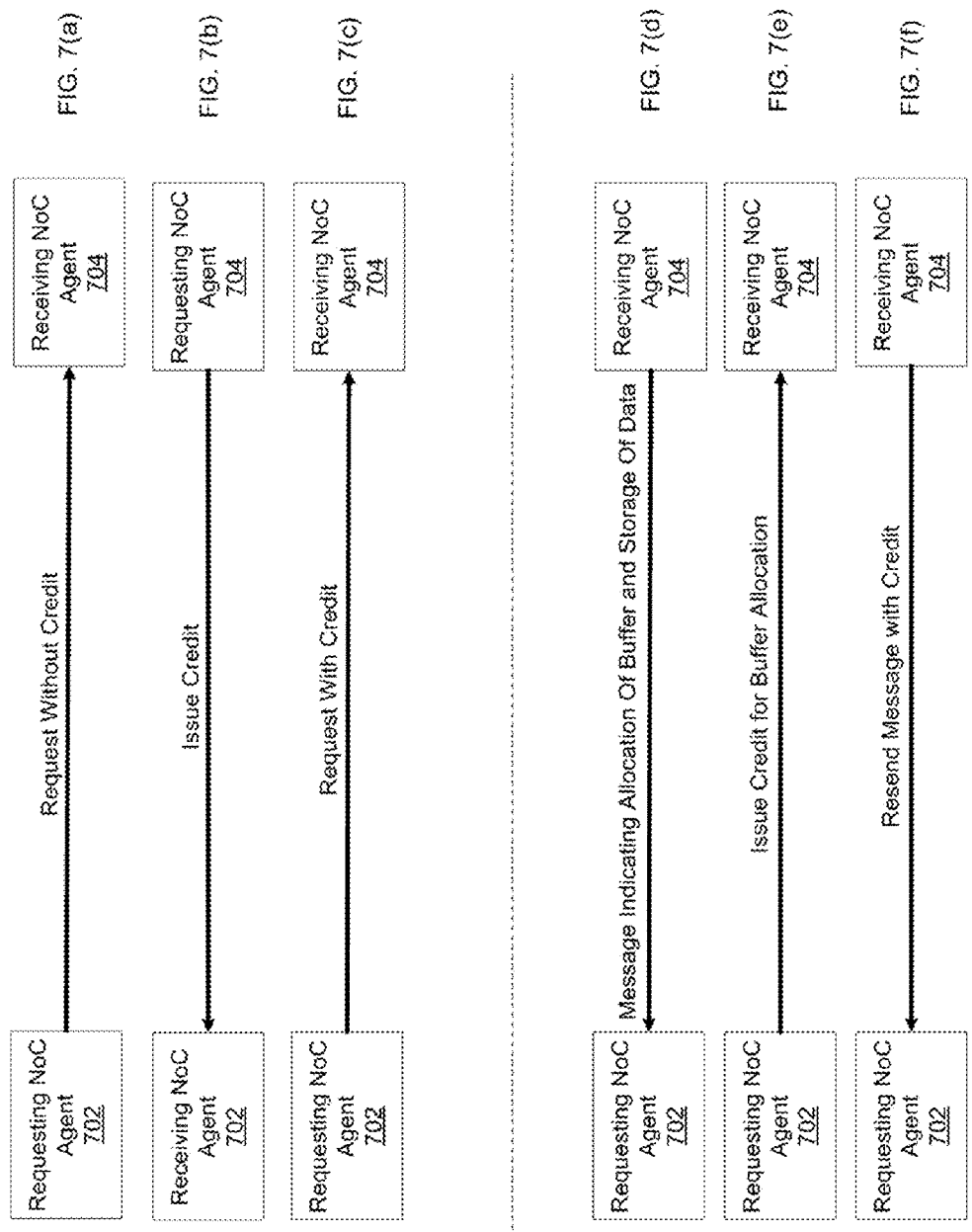
FIG. 7(a)-(f) illustrates an example implementation involving a handshake protocol for transmission of data from requesting NoC agent to receiving NoC agent.

During the next three transactions, the receiving agent 704 sends (FIG. 7(d)) a message to the requesting agent 702 to indicate that the buffer has been allocated and storage of data has been completed. However, the requesting agent 702 may also be acting as a receiving agent for other agents of the NoC and may not be able to process the message when the message is sent. The requesting agent 702 therefore issues (FIG. 7(e)) a credit for buffer allocation to the receiving agent 704, whereupon the receiving agent 704 resends (FIG. 7(f)) the message with the credit.

Figure 8:
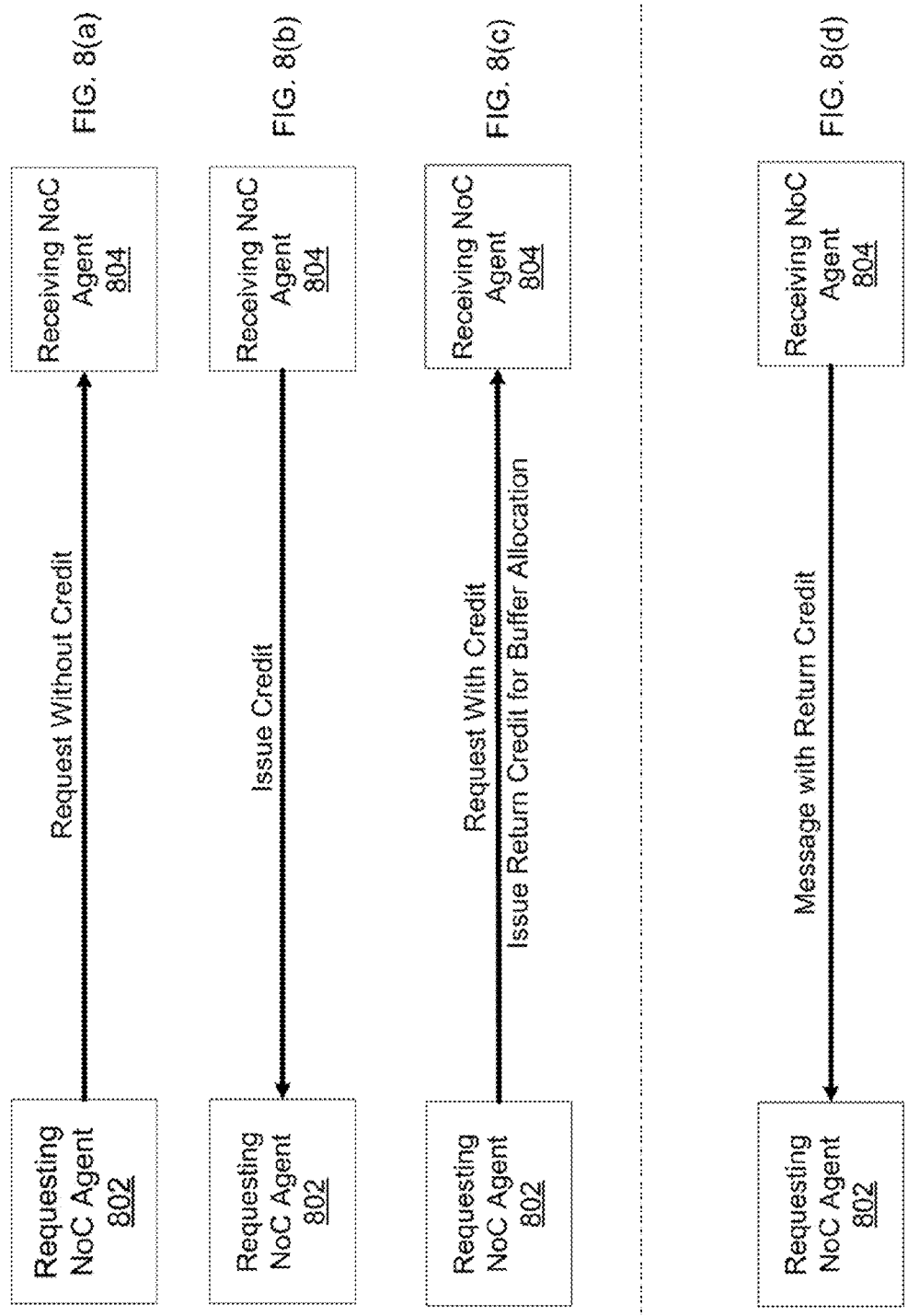
FIG. 8(a)-(d) illustrates an example involving preemptive issuance of credits by a memory controller in accordance with an example implementation.

In an implementation, number of transactions in FIG. 7(a)-(f) can be reduced from six transactions to four transactions by preemptively issuing credits for buffer allocation. FIG. 8 illustrates an example involving preemptive issuance of credits as applied to FIG. 7(a)-(f). The first three transactions FIGS. 8(a)-8(c) are similar to that of FIGS. 7(a)-7(c), only in this example the requesting agent 802 knows that the receiving agent 804 will provide a message to indicate completion/failure of the storage of data into the buffer. Therefore, when the requesting agent 802 resends (FIG. 8(c)) the request and credit for buffer allocation, the requesting agent 802 also issues a credit for buffer allocation as a return credit for the message. Thus, the receiving agent 804 only needs one transaction to send (FIG. 8(d)) the message to the requesting agent 802 by attaching the return credit to the message. The requesting agent 802 can then be compelled to store the message in its buffer.

In example implementations of the present disclosure, buffers in memory of a receiving agent 804 can be used to form a common pool, or can be reserved for use only by specific requesting agents 802 based on the QoS policy. In either implementation, buffer can be allocated according to the QoS policy and the handshake protocols. For example, for implementations that reserve buffers for specific requesting agents, the receiving agent 804 can decide to preemptively allocate buffers to specific agents based on the QoS policy (e.g., 10 buffers for agent 1, 20 buffers for agent 2, etc.), wherein the buffers allocated are only utilized by specific agents as determined by the receiving agent.

In another example implementation, a common pool of buffers can be utilized, wherein buffers are allocated based on QoS policy. In such an implementation, receiving agent can be configured to keep track of how many credits were given to each requestor during a predetermined period (e.g., last T cycles) depending on the desired implementation.

To illustrate an example implementation involving a pool of buffers, let the number of buffers allocated to each of the requesting agents associated with the receiving agent be denoted as $b_1, b_2, b_3, \ldots, b_n$, where $1, \ldots,$ and n denotes the requesting agent. For each cycle T, the receiving agent can be configured to determine how many buffers has the receiving agent given to each requestor. Let $C_1, C_2, C_3, \ldots, C_n$ be a constant indicative of a threshold of buffer allocations for agents $1, \ldots,$ and n. In one example, the receiving agent can automatically issue a credit if $b_i<C_i$, otherwise the handshake protocol can be used to determine allocation of a credit.

Other variations of this implementation are also possible. For example, a function f ($b_1$, $b_2$, . . . , $b_n$) can be implemented such that if $b_i<[C_i*\text{function}(b_1, b_2, \ldots, b_n)]$, a credit can be automatically issued. Function can be predicated on any factor as needed for the desired implementation. For example, the function can optimize credit allocation such that credits are issued if other agents are idle. In such an implementation, function can be configured such that if other $b_1$, $b_2$, . . . , $b_n$, are zero, the function is a high number (e.g. (summation of $C_i$/summation of $b_i$). This is because when a value of b is zero, the requesting agent is idle as the requesting agent has not asked for anything for last T cycles. Other functions are also possible based on the desired policy.

In an example embodiment, an implementation involving a common pool of buffers can be used in conjunction with or separately from an implementation involving reserving buffers for specific receiving agents.

In example implementations where buffers can be reserved for specific requesting agents, receiving agent can send pre-credits to the specific requesting agents based on reserved buffers. Similar implementations can also be used with the implementation involving a common pool of buffers, wherein number of pre-credits can be based on some algorithm according to a desired implementation. For example, when a buffer is available in the pool, pre-credit can be automatically sent based on determining requesting agents that need a credit (e.g., are either waiting, were previously denied, etc.)), ($C_i-b_i$) can be computed, requesting agents having highest value of ($C_i-b_i$) can be determined, and a credit can be issued to requesting agent when a buffer is available. Other implementations are also possible, such as sending a credit to the requesting agent that has the highest value of $[(C_i-b_i)/b_i]$, or by other weighted allocation schemes depending on the desired implementation.

In other example implementations, certain requests can be prioritized over other requests. In such an implementation, the receiving agent can be configured to process a request for accepting data from a requesting agent associated with the NoC and determine a priority of the request. When the priority of the request is determined to be high, the receiving agent can automatically allocate a credit for buffer allocation to the agent. In this manner, high priority requests can be processed more quickly by ensuring that a credit is sent to the requesting agent without requiring the agent to wait or resend the request at a later time interval. For requests that are not high priority, the receiving agent can utilize a handshake protocol as described above to either notify the agent of buffer not being available or allocating a credit when buffer is available. The notification can take the form of an indication such as a message, or can be implemented in other ways depending on the desired implementation.

Further, the priority scheme can be implemented based on desired implementation of the NoC. For example, if requests from the Central Processing Unit (CPU) agent of the NoC are considered to be high priority, then requests from the CPU can be indicated as high priority by either a flag or by other implementations. In an example implementation, a high priority request can always be serviced before a request that is not high priority and no arbitration is needed for the high priority requests. If multiple high priority requests are received by the requesting agent, arbitration implementations such as the credit system and handshake protocol as described above can be applied to arbitrate between multiple high priority requests.

Figure 9:
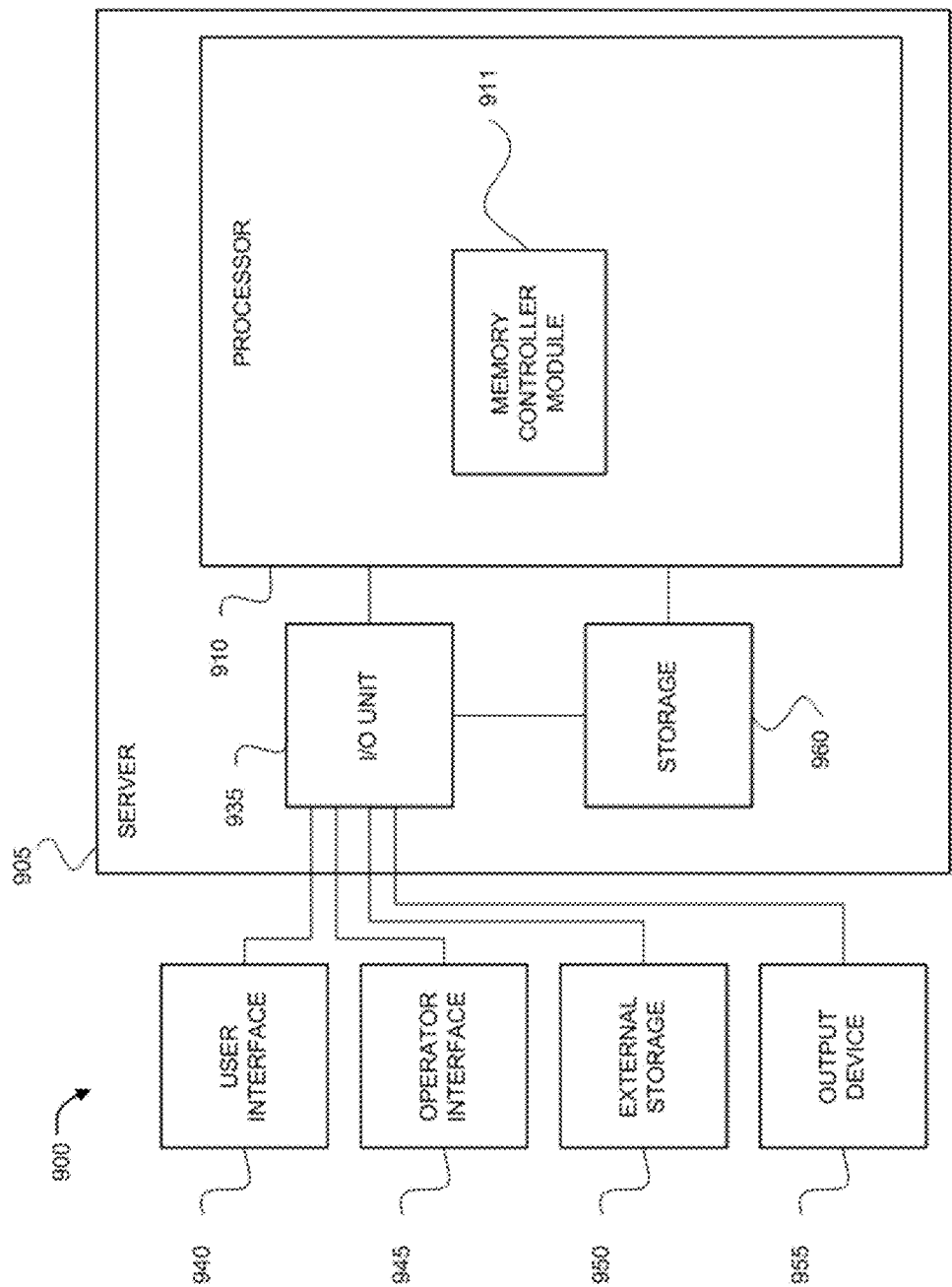
FIG. 9 illustrates a computer system block diagram upon which example implementations described herein may be implemented.

FIG. 9 illustrates an example computer system 900 on which example implementations may be implemented. In an example embodiment, system 900 can include a computing device such as a computer 905, which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer readable storage mediums, such as, but not limited to optical disks, magnetic disks, read-only memories, random access memories, solid state devices and drives, or any other types of tangible media suitable for storing electronic information, or computer readable signal mediums, which can include media such as carrier waves. The I/O unit 935 processes input from user interfaces 940 and operator interfaces 945 which may utilize input devices such as a keyboard, mouse, touch device, or verbal command.

Computer 905 may also be connected to an external storage 950, which can contain removable storage such as a portable hard drive, optical media (CD or DVD), disk media or any other medium from which a computer can read executable code. The computer may also be connected an output device 955, such as a display to output data and other information to a user, as well as request additional information from a user. Connections from computer 905 to user interface 940, operator interface 945, external storage 950, and output device 955 may be through wireless protocols, such as the 802.11 standards, Bluetooth® or cellular protocols, or via physical transmission media, such as cables or fiber optics. Output device 955 may therefore further act as an input device for interacting with a user.

Processor 910 may execute one or more modules including a memory controller module 911 that is configured to generate instructions for transmitting data/packets into/from memory controllers of one or more agents of NoC. Module 911 can also be configured to facilitate Quality-of-Service (QoS) through various protocols such as a QoS policy, handshaking protocols, and other protocols depending on desired implementations, wherein the module 911 can either configured within each memory controller of respective NoC agent, or in a group/sub-group of controllers, or can be externally implemented to control and be operatively/communicatively coupled with respective memory controllers. Instructions of the module 911 can be configured to facilitate interaction between the data/packet requesting NoC agents and receiving NoC agents. Such instructions, for instance, can be implemented on a non-transitory computer readable medium and configured to process a request for accepting data, wherein the module 911 may determine whether to act on the request or deny the request. Module 911 may also be configured to implement and allocate bandwidth to associated NoC agents based on a QoS policy by issuing credits for buffer allocation, thereby behaving as a QoS policy allocator (QPA).

In some example implementations, the computer system 900 can be implemented in a computing environment such as a cloud. Such a computing environment can include the computer system 900 being implemented as or communicatively connected to one or more other devices by a network and also connected to one or more storage devices. Such devices can include movable user equipment (UE) (e.g., smartphones, devices in vehicles and other machines, devices carried by humans and animals, and the like), mobile devices (e.g., tablets, notebooks, laptops, personal computers, portable televisions, radios, and the like), and devices designed for stationary use (e.g., desktop computers, other computers, information kiosks, televisions with one or more processors embedded therein and/or coupled thereto, radios, and the like).

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A non-transitory computer readable storage medium storing instructions for executing a process, the instructions comprising:
    allocating one or more buffers to one or more agents associated with a Network on Chip (NoC) based on a Quality of Service (QoS) policy;
    sending one or more credits for buffer allocation to the one or more agents based on the allocation;
    accepting data from an agent and a return credit; and
    using the return credit to transmit data back to the agent;
    processing a request for accepting data from an agent associated with the NoC;
    determining a priority of the request;
    for a determination indicative of the priority being high, allocate a credit for buffer allocation to the agent;
    for a determination indicative of the of the priority not being high, performing one of:
        notifying the agent of buffer not being available; and
        allocating a credit when buffer is available.

2. The non-transitory computer readable storage medium of claim 1, wherein the allocating the one or more buffers comprises:
    reserving one or more buffers to ones of the one or more agents that require a reserve buffer based on the QoS policy.

3. The non-transitory computer readable storage medium of claim 1, wherein the allocating the one or more buffers comprises:
    allocating one or more buffers from a pool of buffers to ones of the one or more agents based on the QoS policy.

4. An agent associated with a Network on Chip (NoC) comprising:
    a processor, configured to:
        allocate one or more buffers to one or more other agents associated with the Network on Chip (NoC) based on a Quality of Service (QoS) policy;
        send one or more credits for buffer allocation to the one or more other agents based on the allocation;
        receive data from another agent and a return credit; and
        use the return credit to transmit data back to the another agent;
        process a request for accepting data from another agent associated with the NoC;
        determining a priority of the request;
        for a determination indicative of the priority being high, allocate a credit for buffer allocation to the agent;
        for a determination indicative of the of the priority not being high, performing one of:
            notifying the another agent of buffer not being available; and
            sending a credit to the another agent when buffer is available.

5. The agent of claim 4, wherein the processor is configured to allocate the one or more buffers by:
    reserving one or more buffers to ones of the one or more other agents that require a reserve buffer based on the QoS policy.

6. The agent of claim 4, wherein the processor is configured to allocate the one or more buffers by:
    allocating one or more buffers from a pool of buffers to ones of the one or more other agents based on the QoS policy.

7. A method, comprising:
    allocating one or more buffers to one or more agents associated with a Network on Chip (NoC) based on a Quality of Service (QoS) policy;
    sending one or more credits for buffer allocation to the one or more agents based on the allocation;
    accepting data from an agent and a return credit; and
    using the return credit to transmit data back to the agent;
    processing a request for accepting data from an agent associated with the NoC;
    determining a priority of the request;
    for a determination indicative of the priority being high, allocate a credit for buffer allocation to the agent;
    for a determination indicative of the of the priority not being high, performing one of:
        notifying the agent of buffer not being available; and
        allocating a credit when buffer is available.

8. The method of claim 7, wherein the allocating the one or more buffers comprises:
    reserving one or more buffers to ones of the one or more agents that require a reserve buffer based on the QoS policy.

9. The method of claim 7, wherein the allocating the one or more buffers comprises:
    allocating one or more buffers from a pool of buffers to ones of the one or more agents based on the QoS policy.

* * * * *